United States Patent
Naimer et al.

(10) Patent No.: US 7,825,831 B2
(45) Date of Patent: Nov. 2, 2010

(54) AIRCRAFT FLIGHT DISPLAY WITH A NON-LINEAR PITCH SCALE

(75) Inventors: Joachim Laurenz Naimer, Ascona (CH); James Mitchell Brannen, Flowery Branch, GA (US); John Russell Jorgensen, Lynnwood, WA (US); Cheng Wang, Bothell, WA (US); Patrick Krohn, Bellevue, WA (US)

(73) Assignee: Universal Avionics Systems Corp., Tuscon, AZ (US)

( * ) Notice: Subject to any disclaimer, the term of this patent is extended or adjusted under 35 U.S.C. 154(b) by 406 days.

(21) Appl. No.: 11/940,112

(22) Filed: Nov. 14, 2007

(65) Prior Publication Data

US 2009/0121901 A1    May 14, 2009

(51) Int. Cl.
*G01C 23/00* (2006.01)
(52) U.S. Cl. .................................. 340/975; 340/970
(58) Field of Classification Search .......... 340/970–977
See application file for complete search history.

(56) References Cited

U.S. PATENT DOCUMENTS

| | | | |
|---|---|---|---|
| 5,337,048 A * | 8/1994 | Penwill | 340/975 |
| 5,555,175 A | 9/1996 | D'orso | |
| 6,727,912 B1 * | 4/2004 | Wyatt | 345/660 |
| 6,822,624 B2 * | 11/2004 | Naimer et al. | 345/9 |
| 2004/0160341 A1 * | 8/2004 | Feyereisen et al. | 340/970 |
| 2007/0080828 A1 * | 4/2007 | He | 340/974 |
| 2007/0171094 A1 * | 7/2007 | Alter et al. | 340/970 |

* cited by examiner

*Primary Examiner*—Brent Swarthout
(74) *Attorney, Agent, or Firm*—Quarles & Brady LLP; George E. Haas

(57) ABSTRACT

A display image for use in an aircraft is produced in response to receiving aircraft location, heading, altitude, and pitch data. The location and heading data are employed to access a topographical database and obtain terrain information for a region on the earth's surface ahead of the aircraft. A terrain image is produced from the terrain information and a non-linear pitch scale is superimposed over the terrain image. The non-linear pitch scale corresponds to the relationship of the aircraft pitch and the terrain image. Additional data designating other aircraft operational parameters, such as speed and altitude, are depicted by graphical objects. The terrain image, the non-linear pitch scale, and the graphical objects are combined into the display image. The terrain image and the non-linear pitch scale move in the display image in response to changes in the pitch of the aircraft.

22 Claims, 3 Drawing Sheets

AIRCRAFT FLIGHT DISPLAY WITH A NON-LINEAR PITCH SCALE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to display systems for aircraft, and more particularly to the aircraft's primary flight display.

2. Description of the Related Art

The flight deck of an aircraft has several displays that present information about the aircraft operation and flight conditions. These displays are employed to monitor various events in real-time and to provide a visual indication of such events in graphical form thereby allowing an observer to make decisions based on the occurrence of one or more specific events in particular relationship to each other. One of the key instruments used by aircraft pilots is a display commonly referred to as a Primary Flight Display, or PFD, used to operate and/or maneuver aircrafts during take-off; flight and landing. When the aircraft is in flight, the PFD provides numerous information about the aircraft, such as its heading, roll (the angle of wings relative to horizontal), and pitch (the degree to which the aircraft nose is pointing up or down relative to the horizontal. The graphics depicted by the PFD are arranged in a standard format to allow a pilot to quickly locate particular information by focusing in on the specific part of the display screen to which the information has been assigned.

FIG. 1 depicts a standard graphic and textual information arrangement on a PFD. Note that textual information is included with other graphical information to allow the pilot of the aircraft to determine the status of various sensor readings being provided to the aircraft while in flight. The sensor readings present information from different sources which are converted to graphical signals for display on the PFD.

The depiction of the Primary Flight Display in the drawings has been annotated to identify the types of displayed information used by the pilot while the aircraft is in flight, taking off or landing. The "inverted V" shown at generally the center of the display represents the aircraft in reference to the horizontal. The "Zero Roll Reference" is a reference point for determining how much "roll" the aircraft is experiencing during flight with a "Roll Bug" depicting the degree that the aircraft is deviating from a zero roll orientation. The roll is a measure of how much the aircraft is rotated about its longitudinal axis (i.e., the axis that is oriented lengthwise of the aircraft). Also, various speeds of the aircraft are displayed. Specifically a speed tape on the left edge of the PFD indicates the forward speed of the aircraft and an arcuate scale in the lower right corner provides a vertical speed indication. An altitude indicator displays the present altitude in relation to a desired altitude for the aircraft. A heading tape along the bottom edge of the PFD presents information regarding heading of the aircraft and it deviation from a desired heading.

A pitch ladder designates the pitch of the aircraft in degrees with respect to horizontal. The standard PFD has the region below the horizontal uniformly colored brown to correspond to earth and the region above the horizontal uniformly colored blue to correspond to the sky. Pitch is rotation around a transverse axis of the aircraft parallel to the wings. The pitch ladder has a linear scale with five degree increments up and down indicated by equally spaced L-shaped markers with the markers for 10 and 20 degrees being labeled with those numerals. The pitch ladder moves vertically on the display with the current pitch of the aircraft being indicated by alignment of a point of the ladder with the apex of the stationary inverted V-shaped aircraft symbol. In the exemplary indication on the PFD in FIG. 1, the aircraft is level at zero pitch, however if the nose of the aircraft tilts up the horizontal line at zero pitch drops below the aircraft symbol and the pitch ladder also moves downward on the PFD until the degree indication corresponding to the actual pitch is laterally aligned with the apex of the aircraft symbol.

Various other information can be provided by the PFD.

SUMMARY OF THE INVENTION

A method produces an display image for a display screen of an aircraft which involves determining the location and the pitch of the aircraft. The location is employed to access a topographical database that contains data regarding the contour of the surface of the earth, such as for example Shuttle Radar Topography Mission (SRTM) digital topographic data representing elevation data on a near-global scale. Information obtained from the topographical database regarding a region on the surface of the earth ahead of the aircraft is used to produce a terrain image. A non-linear pitch scale then is associated with the terrain image. The terrain image and the non-linear pitch scale are combined into the display image.

Preferably, orientation of the terrain image and the non-linear pitch scale in the display image corresponds to the pitch of the aircraft. That orientation is altered in response to changes in the pitch of the aircraft. In another aspect of this method, other operational parameters of the aircraft is received from which graphical objects depicting those operational parameters of the aircraft are produced and incorporated into the display image.

DETAILED DESCRIPTION OF THE INVENTION

The present invention provides a display generation system and method for an aircraft. The display generation system has access to a topographical database containing information about the contour of the earth's surface and image databases containing image data. That collective information is used to produce an underlay image depicting terrain of the earth over which the aircraft is flying. The underlay terrain image is displayed simultaneously with an overlay image containing information related to the aircraft's current operational status as provided by one or more data sources, such as an navigational system. The combination of the underlay and overlay images produces a combined display signal that represents a graphic image and/or video picture that typically is displayed on a monitor in the aircraft flight deck.

Figure 2:
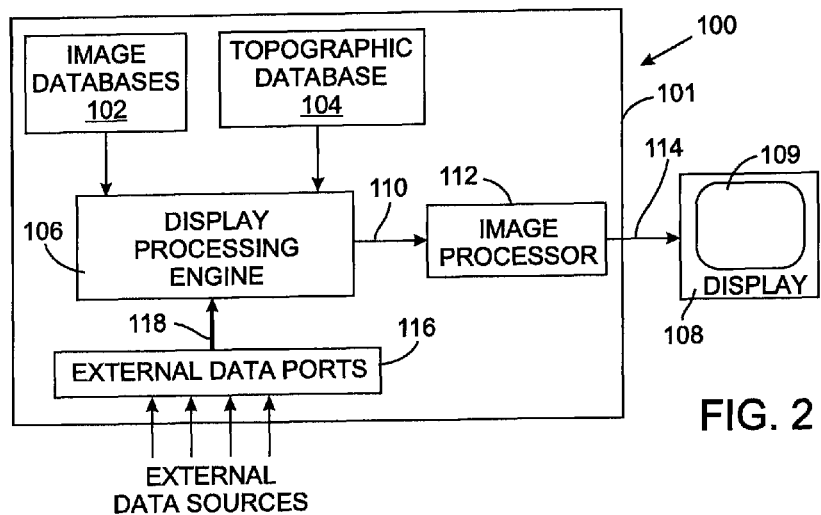
FIG. 2 is a block diagram of the display generation system according to the present invention.

With initial reference to FIG. 2, a display system 100 for an aircraft comprises a display generation system 101 and a display device 108, which preferably is a video monitor having an LCD, LED or CRT display screen. The display generation system 101 and method of the present invention are being described in the context of a PFD, however the concepts may be used with other types of aircraft displays.

Display generation system 101 includes a display processing engine 106 that obtains information from one or more image database 102 and a topographical database 104, as well as receiving external information from various data sources via data ports 116 and path 118. The collective information so obtained is employed to produce graphical and/or video images for the display device 108. The display processing engine 106 may be any device or system, such as a microcomputer or image processor, that is able to obtain information regarding images and generate display signals for the images. The term "image" as used herein comprises either and arrangement of one or more graphic images, a video image, or any combination thereof. The signal paths connecting the various components can be any well known media typically used to transmit and/or receive signals. Therefore, the paths can be, for example, copper or other electrical wire, coaxial cables, fiber optic cables, and waveguides.

The topographical database 104 contains data regarding the contour of the surface of the earth, for example Shuttle Radar Topography Mission (SRTM) digital topographic data representing elevation data on a near-global scale. Moreover, different perspectives of the various objects, geographical features, or scenery can also be stored in the topographical database 104. The display processing engine 106 receives data via external data ports 116 from the on-board navigational system, designating the location and heading of the aircraft. The present location, altitude, and heading data are employed to access the topographical database 104 to obtain contour information for an area in front of the aircraft. Instead of using the heading of the aircraft, the bearing of the aircraft with respect to a topographical feature near the aircraft's present location could be employed to obtain contour information for an area in front of the aircraft for image construction purposes. Therefore the use of the term heading herein also encompasses the use of bearing information. The display processing engine 106 uses that topographic contour information to construct a shaded, color underlay image depicting the earth's terrain ahead in the aircraft's flight path, which underlay image is provided as a first display signal. The terrain image changes periodically as the aircraft moves forward over the terrain and the frequency at which the image changes is directly related to the smoothness of the motion depicted by the display. Although display of the terrain image is particularly useful to the aircraft crew during flight, it also is useful during take-off, landing and taxiing collectively referred to as when the aircraft is proximate the surface of the earth.

The image database 102 contains information used to generate an overlay image depicting objects (animate or inanimate) with various levels of details that denote operational parameters of the aircraft and is similar to databases used for previous primary flight displays. The display processing engine 106 receives data from the external data sources indicating the status of aircraft operational parameters, such as speed, altitude, roll and pitch. The aircraft operational parameters and information from the image database are used by the display processing engine 106 to generate a second display signal that represents the overlay image containing graphics that indicate the present operating status of the aircraft.

The overlay image then is superimposed over the underlay image to produce a display image for presentation on the display device 108. The result of this image processing is a combined display signal on path 110 from the display processing engine 106. The combined display signal can be digital and/or analog in the form of electrical signals, infrared signal, optical signals or any other type of signal that can be converted by a display device to depict images.

The combined display signal representing the display image is applied to an image processor 112 which converts that signal to be compatible with one or more formats (or protocols) commonly used by display devices. Image processor 112 performs a function similar to a symbol generator circuit that is typically used by display devices to generate images; that is, the display signals are converted to a VGA (Variable Graphics Array) signal or a RGB (Red, Green and Blue) signals or any other well known analog and/or digital signals typically used to generate images on a display device. The resultant display signal from the image processor 112 is routed onto path 114 for reception by the display device 108 that has a display screen 109 on which the image is displayed.

Figure 3:
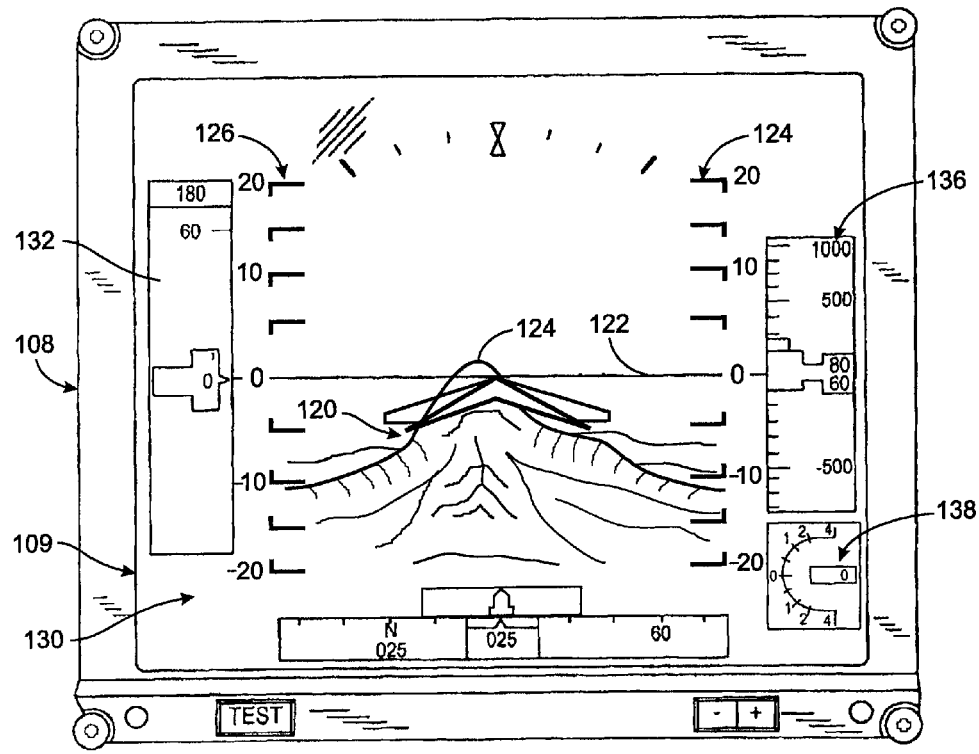
FIG. 3 is an improved display device depicting a primary flight display with a terrain underlay image and a non-linear pitch scale.

FIG. 3 depicts an exemplary display image 130 that is presented to the pilot on the display screen 109 of device 108 as a result of the processing performed by the display generation system 101. Preferably, the image is in color to provide greater contrast among the objects contained in the display image. The exemplary terrain 120 depicted in the display image 130 illustrates a mountain in front of the aircraft with the horizontal, or zero, pitch line 122 passing through the mountain just below its peak 124. Associated with the terrain image 120 are two pitch scales 124 and 126 extending vertically on the left and right sides. Each pitch scale contains L-shaped degree markers above and below the zero pitch line 122 indicating five degree increments with the corresponding numbers designating the 10 and 20 degree markers. Each pitch scale 124 and 126 is non-linear in that the spacing between adjacent five degree markers decreases going farther away from the zero pitch line 122. In other words, the distance between the zero pitch line 122 and each 10 degree marker is greater than the distance between the 10 degree marker and the 20 degree marker, even though those distances correspond to the same number of degrees on the scale.

Figure 1:
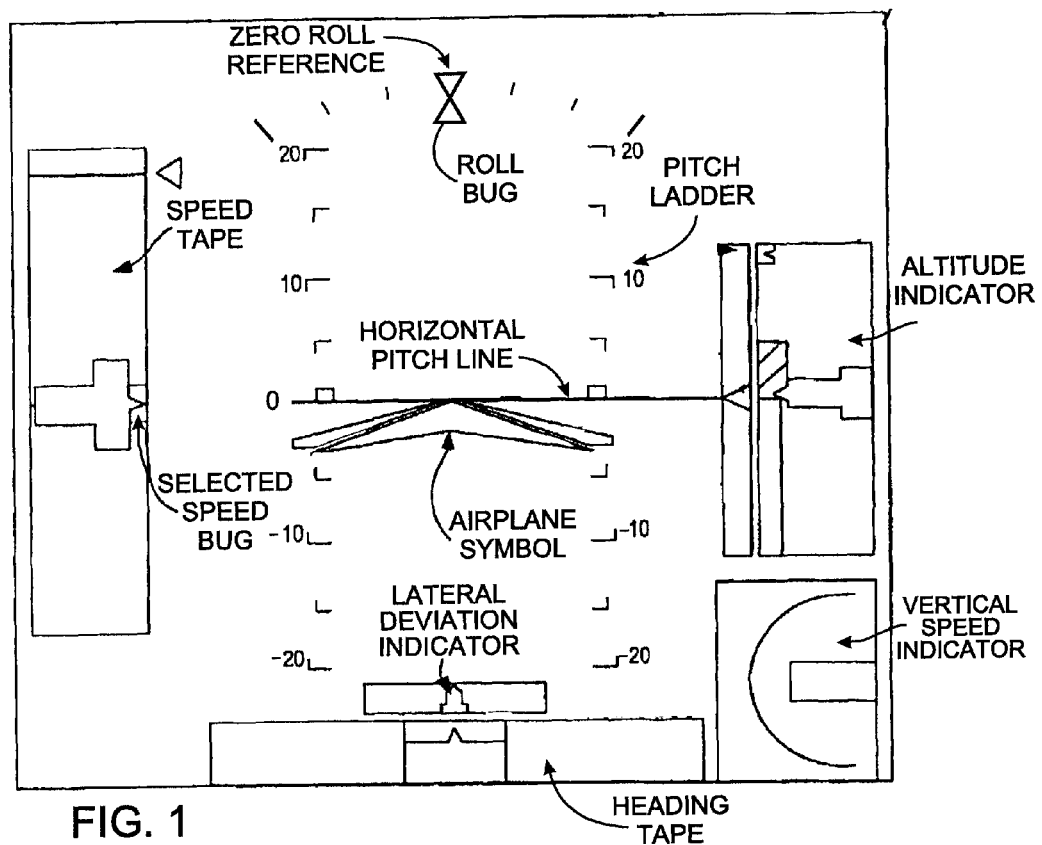
FIG. 1 shows an annotated version of a conventional primary flight display graphic.

As noted previously with respect to the conventional PFD in FIG. 1, the standard pitch ladder used on those previous displays had a linear scale in that there was the same distance between marks on the scale corresponding to identical degree increments. However, using readily available topographical data with standard terrain generation techniques produces terrain images that do not correspond to a linear, or uniformly spaced, pitch scale. As a consequence, simply superimposing a conventional linear pitch scale over the terrain image results in an inaccurate relationship between motion of the terrain image and the pitch indicators as the aircraft climbs and descends. Therefore, the pitch scales 124 and 126 are non-linear and have gradations that match relationship of the terrain image to aircraft pitch.

The display image 130 on the display screen also contains several graphical objects 132, 134, 136 and 138 which indicate operational parameters of the aircraft. Those graphical objects are formed by the display processing engine 106 from operational data received through the data ports 116 and information from the image database 102. In the exemplary display image 130, a first graphical object 132 corresponds to a standard speed tape indicating the speed of the aircraft and a second graphical object 134 is a heading tape. The third graphical object 136 is an altitude indicator, while the graphical object 138 indicates vertical speed.

Figure 4:
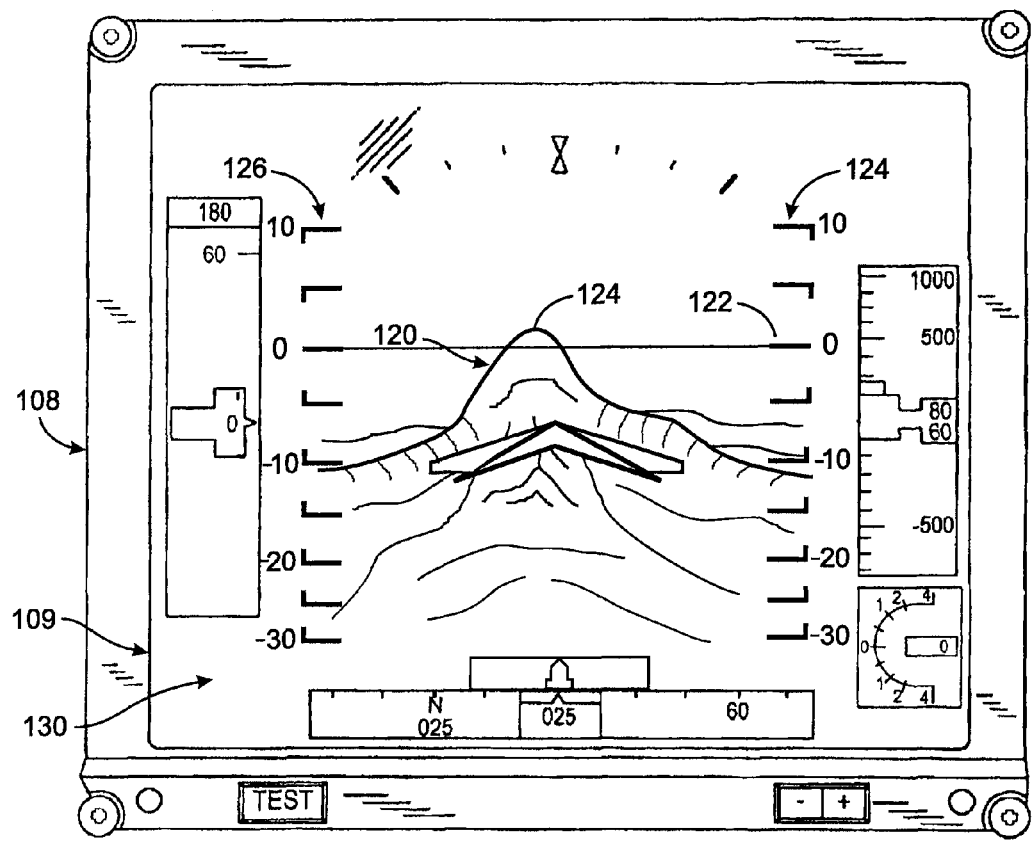
FIG. 4 illustrates the primary flight display when the aircraft is pitching downward.

With reference to FIG. 4, as the aircraft pitches downward, such as during a descent, the terrain image 120 rises on the display screen. The two pitch scales 124 and 126 also move upward the same amount as the terrain image. Note that the minus 30 degree marks now appear near the bottom of the terrain image and are spaced much closer to the 20 degree marks than the 20 degree marks are spaced with respect to the 10 degree marks, further denoting the non-linear relationship of aircraft pitch to the terrain image. A similar opposite motion of the terrain image and the pitch scale occurs as the aircraft climbs.

Alternatively, a linear pitch scale could be utilized in which case the display processing image 106 would morph, or distort, the terrain image in the vertical dimension in order for the terrain image to correspond to the linear pitch scale. Nevertheless, there is a limit to the amount of morphing which is practical before the terrain image no longer accurately represents the actual terrain appearing through the window of the aircraft and becomes so disconcerting to the pilot.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A method for producing an display image for a display screen in an aircraft which is proximate to a surface of the earth, the method comprising:
   receiving information indicating location and pitch of the aircraft;
   using the location of the aircraft to access a topographical database and obtain terrain information regarding a region on the surface of the earth near the aircraft;
   producing a terrain image from the terrain information;
   associating a non-linear pitch scale with the terrain image, wherein the non-linear pitch scale has gradations that match a relationship of the terrain image to aircraft pitch; and
   combining the terrain image and the non-linear pitch scale into the display image.

2. The method as recited in claim 1 further comprising:
   determining a heading of the aircraft; and
   further using the heading of the aircraft to access a topographical database and obtain terrain information regarding a region on the surface of the earth.

3. The method as recited in claim 1 wherein orientation of the terrain image and the non-linear pitch scale in the display image corresponds to the pitch of the aircraft.

4. The method as recited in claim 1 wherein the terrain image and the non-linear pitch scale are altered in the display image in response to changes in the pitch of the aircraft.

5. The method as recited in claim 1 wherein the topographical database contains Shuttle Radar Topography Mission (SRTM) digital topographic data.

6. The method as recited in claim 1 further comprising presenting the display image on the display screen of the aircraft.

7. The method as recited in claim 1 further comprising:
   receiving data designating operational parameters of the aircraft;
   producing graphical objects depicting the operational parameters of the aircraft; and
   incorporating the graphical objects into the display image.

8. The method as recited in claim 1 further comprising receiving information indicating altitude of the aircraft, and using the altitude to produce the a terrain image.

9. A method for producing a display image for a display screen of an aircraft that is proximate to a surface of the earth, the method comprising:
   receiving data indicating location, altitude, heading, and pitch of the aircraft;
   using the location and heading of the aircraft to access a topographical database and obtain terrain information regarding a region on the surface of the earth near the aircraft;
   producing a terrain image from the terrain information and the altitude;
   associating a pitch scale with the terrain image, wherein the pitch scale has non-linearly spaced gradations corresponding to a non-linear relationship of aircraft pitch to the terrain image;
   receiving data designating operational parameters of the aircraft;
   producing graphical objects depicting the operational parameters of the aircraft; and
   combining the terrain image, the pitch scale, and the graphical objects into the display image.

10. The method as recited in claim 9 wherein orientation of the terrain image and the pitch scale in the display image corresponds to the pitch of the aircraft.

11. The method as recited in claim 9 wherein positions of the terrain image and the pitch scale in the display image are altered in response to changes in the pitch of the aircraft.

12. The method as recited in claim 9 wherein the topographical database contains Shuttle Radar Topography Mission (SRTM) digital topographic data.

13. The method as recited in claim 9 further comprising displaying the display image on the display screen of the aircraft.

14. A system which produces an display image in an aircraft that is proximate to a surface of the earth, the system comprising:
   at least one data port for receiving information designating location and pitch of the aircraft;
   a topographical database containing terrain information regarding the surface of the earth near the aircraft; and
   a display processing engine which accesses the topographical database in response to location information received by the at least one data port and obtains the terrain information for a region on the surface of the earth, and which produces a terrain image from the terrain information, the display processing engine further associating a non-linear pitch scale with the terrain image, wherein the non-linear pitch scale has non-linearly spaced gradations corresponding to a non-linear relationship of aircraft pitch to the terrain image, and combines the terrain image and the non-linear pitch scale into the display image.

15. The system as recited in claim 14 wherein the display processing engine orients the terrain image and the non-linear pitch scale in the display image to correspond to the pitch of the aircraft.

16. The system as recited in claim 14 wherein the display processing engine alters positions of the terrain image and the non-linear pitch scale in the display image in response to changes in the pitch of the aircraft.

17. The system as recited in claim 14 wherein the topographical database contains Shuttle Radar Topography Mission (SRTM) digital topographic data.

18. The system as recited in claim 14 further comprising a display screen on which the display image is displayed.

19. The system as recited in claim 14 wherein the at least one data port further receives data designating operational parameters of the aircraft; and the display processing engine produces graphical objects depicting the operational parameters of the aircraft, and incorporates the graphical objects into the display image.

20. The system as recited in claim 14 wherein the at least one data port further receives information designating altitude of the aircraft; and the display processing engine employs the altitude of the aircraft to produce the terrain image.

21. The method as recited in claim 1 wherein steps of receiving information and producing a terrain image are performed by an electronic display processing engine.

22. The method as recited in claim 9 wherein steps of receiving data and producing a terrain image are performed by an electronic display processing engine.

* * * * *